Feb. 3, 1970
L. R. STAFFORD
3,492,702
LINE GRIP DEVICE
Filed April 29, 1968
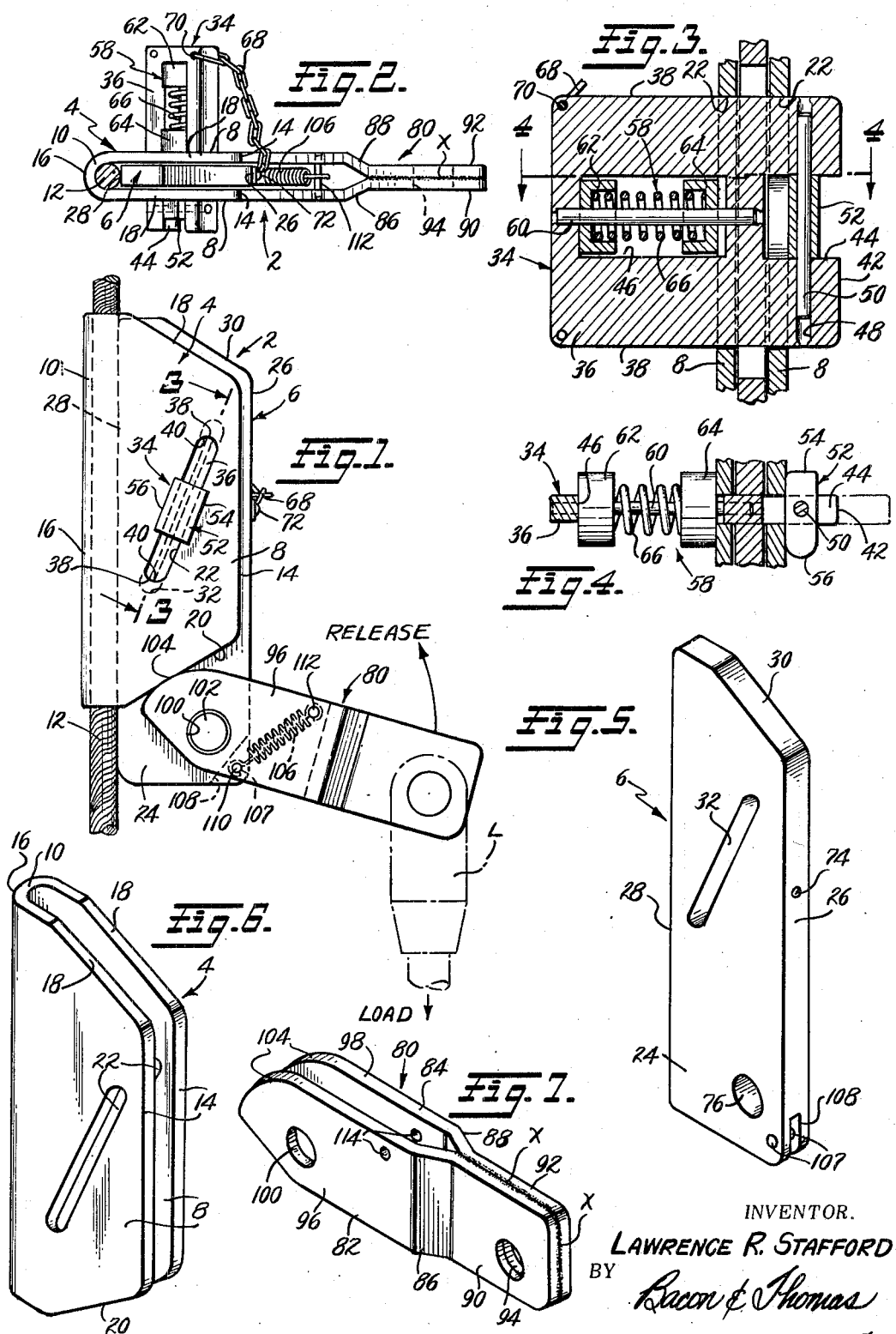
INVENTOR.
LAWRENCE R. STAFFORD
BY
Bacon & Thomas
ATTORNEYS 3,492,702
LINE GRIP DEVICE
Lawrence R. Stafford, 8 Gracemore St.,
Albany, N.Y. 12203
Filed Apr. 29, 1968, Ser. No. 725,101
Int. Cl. F16g 11/00
U.S. Cl. 24—126                                    10 Claims

ABSTRACT OF THE DISCLOSURE

A grip device, for mounting at any point along a line, such as a rope or cable, to support a load, including a one-piece bracket having a pair of side plates connected along one side edge by a U-shaped connecting portion, and a wedge plate receivable between said side plates and having a clamping edge along one side thereof that confronts the U-shaped connecting portion. A quick-release locking key member is removably mounted on the bracket and extends through an inclined slot in the wedge plate to enable the parts to be assembled and disassembled quickly. The inclined slot is such that when the wedge plate is moved in one direction relative to the bracket the clamping edge is urged toward the U-shaped bracket portion to grip the line received therein. A camming lever is pivotally mounted on one end portion of the wedge plate and has a cam surface thereon engageable with the bracket, the lever being designed and mounted so that when it is swung toward an applied position the cam surface thereon moves the wedge plate in a direction to clamp said line. Resilient means is connected between the wedge plate and the lever to bias the latter toward said applied position, the lever having means for connecting a load thereto.

BACKGROUND OF THE INVENTION

Field of the invention

This invention relates generally to grip devices mountable on a line to support a load. More particularly, it relates to a new grip device that can be readily mounted on and positioned wherever desired along the length of a line, and which will effectively grip the line when a load is placed thereon to thus provide support for said load.

Description of the prior art

There frequently is need to connect a load to a fixed or movable line, either temporarily or for long periods. For example, scaffolds and like devices are commonly connected to fixed lines fastened to hang from the top of a building or other structure, and many grip devices for connecting loads to such lines have been devised. In some instances, grip devices have been used to connect a load to a moving line. These past grip devices are usually mechanically complicated, and are difficult to install and move.

There is need for a grip device that is mechanically simple and economical to manufacture, and which nevertheless provides effective, safe gripping action. Moreover, there is also need for a grip device that can be easily installed wherever desired along the length of a line, and which can be easily moved merely by releasing the gripping action and sliding the device to another position or removed from the line by withdrawing the quick-release locking key. The present invention satisfies these needs.

SUMMARY OF THE INVENTION

The line grip of the invention is constructed so that it can be installed at any point along a line, and so that it can be released and removed from the line, or moved to a new position without removing it from the line. The device is designed to automatically grip the line under no load conditions and to more positively grip the line whenever a load is applied thereto, whereby the device then serves as an anchor and support for the load. One form of the grip device is small in size and light in weight, and is particularly useful to connect the life belt, or scaffold of a window washer, painter or other workman, to a life or safety line.

The present grip device includes a one-piece bracket comprising a pair of parallel side plates joined along one edge thereof by a U-shaped connector portion, the side plates being spaced apart a distance about equal to the diameter of the line and receiving a wedge plate therebetween. The wedge plate includes a clamping side edge disposed to confront the U-shaped bracket portion, and one end of the plate projects substantially beyond one end of the bracket.

The wedge plate has an inclined, elongated slot therein sloping outwardly from the clamping edge of the plate, from near said projecting end of the plate toward the other end thereof. A removable key element is carried by the bracket, and is receivable through the elongated slot therein to secure the wedge plate to the bracket. The preferred method for mounting the grip device on a line is to first remove the key element, after which the grip plate is taken out of the bracket. The bracket is then merely slipped over the line at the location desired, after which the wedge plate is inserted in the bracket and the key element is reinstalled. The grip device can also be mounted without removing the grip plate by threading the line therethrough; however, this method of installation is unnecessary and has obvious limitations.

The bifurcated end of a camming lever is pivotally connected to the projecting end of the wedge plate, the legs of said bifurcated end having cam surfaces thereon, successive portions of which progressively engage the bracket as the lever is swung from a retracted position toward a fully applied position. Such progressive engagement of the cam surfaces moves the wedge plate toward the U-shaped portion of the bracket. The key element and the elongated slot in the wedge plate cooperate during such movement of the wedge plate to move the clamping edge of the wedge plate toward the U-shaped bracket portion, resulting in gripping of a line received in the bracket. This gripping action is increased as the load applied to the lever increases, the lever having means for connecting a load thereto.

The lever is automatically preloaded by a spring connected between it and the wedge plate, and which is arranged to urge the lever toward its applied position. Thus, the grip device will normally lightly grip a line received therein, which grip will be increased when a load is applied to the lever that pulls it toward the applied position. The grip device can be easily moved along the line by merely moving the lever toward its retracted position against the force of the spring, until gripping action terminates sufficiently to allow the device to slide along the line.

The present grip device can be utilized with lines made of fiber, metal or plastic. Because of its light weight and easy manipulability, it is especially useful for attaching a workman's safety strap to a safety line. The device can be easily moved by the workman when necessary, and will instantly grip the line and support the workman if a mishap should occur.

It is an object of the present invention to provide a grip device that can be easily installed where desired on a line, and which will automatically and effectively grip the line to provide support when a load is applied thereto.

Another object is to provide a grip device that can be easily released and moved to a new position on the line on which it is mounted.

A further object is to provide a grip device that will grip a line with increasing force as greater loads are applied thereto.

Still another object is to provide a grip device that includes a minimum of elements, and which can be economically manufactured.

Yet another object is to provide a grip device with a removable key element, whereby the device can be easily disassembled and removed from a line, or assembled and installed on a line.

Other objects and many of the attendant advantages of the present invention will become readily apparent from the following description of the preferred embodiment, when taken in conjunction with the attached drawings.

DESCRIPTION OF THE DRAWINGS

FIG. 1 is a side elevational view of the line grip of the present invention, a load connecting link being shown in phantom lines connected to the camming lever;

FIG. 2 is a plan view of the line grip of FIG. 1;

FIG. 3 is an enlarged fragmentary vertical sectional view, taken on the line 3—3 of FIG. 1, showing the details of the removable locking key element;

FIG. 4 is a fragmentary horizontal sectional view, taken on the line 4—4 of FIG. 3;

FIG. 5 is an isometric view of the wedge plate of the line grip;

FIG. 6 is an isometric view of the bracket of the line grip; and

FIG. 7 is an isometric view of the camming lever of the line grip.

DESCRIPTION OF THE PREFERRED EMBODIMENTS

Referring now to the drawings, the line grip device of the invention is indicated at 2, and includes a bracket 4 within which a wedge plate 6 is slidably received. The bracket 4 is formed from one piece of material, and includes a pair of identical, parallel side plates 8 joined along one side edge by a U-shaped connecting portion 10. The side plates 8 are spaced apart a distance about equal to the diameter of a line 12 on which the grip 2 is to be mounted, said line 12 being received in the U-shaped bracket portion 10. Because the grip 2 is designed to fit a line 12 of a given diameter, different sized grips 2 are provided for lines of different diameters.

The front, free side edges 14 of the bracket side plates 8 extend parallel to the rear edge 16 of the bracket 4, and the upper and lower end edges 18 and 20, respectively, of said side plates are inclined toward each other to define an angle of about 60 degrees with the rear edge 16. The side plates 8 have confronting key-receiving slots 22 located centrally therein, which are inclined outwardly and upwardly from the bracket rear edge 16 at an angle of about 22.5 degrees, from near the lower side plate ends 20 toward the upper side plate ends 18.

The wedge plate 6 has a thickness just slightly less than the dimension of the space between the parallel bracket side plates 8, and a width a little less than the overall width of the bracket 4 measured between the edges 14 and 16. The length of the wedge plate 6 is substantially greater than the length of the bracket 4, so that one end portion 24 of the plate projects substantially beyond the lower edges 20 of the bracket when the wedge plate is received therein. The front and rear edges 26 and 28, respectively, of the wedge plate 6 are parallel, the rear edge 28 defining a clamping edge or surface that confronts the interior of the U-shaped bracket portion 10 when the wedge plate 6 is received in the bracket 4. The upper end 30 of the wedge plate 6 is inclined, to correspond to the upper ends 18 of the bracket side walls 8.

The wedge plate 6 has an elongated slot 32 therethrough, which is inclined away from the clamping edge 28 at an angle of about 22.5 degrees, from near the projecting end portion 24 toward the upper end 30. The elongated slot 32 is positioned to cooperate with the key-receiving slots 22 when the wedge plate 6 is received in the bracket 4, and a key element 34 is inserted through the aligned slots 22 and 32 and serves to connect the wedge plate 6 to the bracket 4.

The key element 34 is designed to be easily removable, and to be locked in position when installed. The key element 34 comprises a rectangular plate-like body 36 with rounded corners, having a width and thickness just slightly less than the length and width, respectively, of the key-receiving lots 22, the lateral edges 38 of said body 36 being rounded to conform with the like rounded ends 40 of said slots. The front edge 42 of the body 36 has a centrally positioned rectangular notch 44, and the rear portion of said body has an elongated rectangular opening 46 aligned with the notch 44. The notch 44 has a depth about equal to about three times the thickness of the body 36.

A bore 48 is drilled transversely through the forward end of the body 36, to extend along the center of the notch 44, and a shaft 50 is secured within said bore. Mounted on the portion of the shaft 50 exposed within the notch 44 is a rectangular lock element 52, having a thickness about equal to that of the body 36 and a width about equal to the depth of the notch 44. The lock element 52 is pivoted on the shaft 50 between a retracted position, wherein it is turned to lie in the plan of the body 36, and a locking position, as shown in the drawings, wherein the opposite end portions 54 and 56 thereof project substantially beyond both faces of the body 36, the end portion 56 being rounded as shown in FIG. 4.

When the key element 34 is to be inserted through or removed from the slots 22, the lock element 52 is turned to its retracted position. After the key element 34 is installed, the lock element 52 is turned to its locking position, wherein the end portions 54 and 56 thereof will engage the bracket side wall 8 to prevent removal of the key element. The key element 34 is secured when mounted on the bracket 4 by a retainer assembly 58, carried by the body 36.

The retainer assembly 58 includes a shaft 60, mounted to extend along the longitudinal axis of the rectangular opening 46. Mounted on the shaft 60 is a pair of confronting, cup-shaped retainers 62 and 64, the opening 46 being so positioned and dimensioned that the retainer 64 is engageable with one side of the bracket 4 when the lock element 52 is engaged with the opposite side of the bracket. A coil spring 66 is mounted on the shaft 60 and the opposite ends thereof are received in the retainers 62 and 64, the spring functioning to establish a resilient force to resist accidental displacement of the body 36 in the direction of the lock element 52, whereby the possibility of inadvertent pivoting of said element from its locking to its retracted position is eliminated.

With the lock element 52 in its retracted position, the key element 34 is inserted through the slots 22 until the retainer 64 engages the bracket 4. The key element 34 is then pushed to compress the spring 66, until the lock element 52 can be turned to its locking position. When this has been accomplished, the body 36 is released and the spring 66 seats the extended lock element 52 against the bracket 4. Removal of the key element 34 is accomplished in a reverse manner.

To prevent loss of the key element 34, one end of a retainer chain 68 is connected to a hole 70 in a rear corner of the body 36. The other end of said chain is secured to a screw 72 threaded in a bore 74 in the front edge of the wedge plate 6.

The wedge plate 6 has an opening 76 near its lower, front corner, which is utilized to mount the camming lever 80 on the end portion of the wedge plate that projects below the bracket 4 when the line grip 2 is assembled. The camming lever 80 is comprised of a pair of bars 82 and 84 each having a reverse bend portion 86 and 88, respectively, approximately centrally thereof. The outer ends 90 and 92 of the bars 82 and 84, respectively, are placed in engagement so that the reverse bend portions 86 and 88 thereof extend oppositely, and are secured together along the top, bottom and outer ends by welds X. An opening 94 extends through the welded outer ends 90 and 92 of the camming lever 80, and serves to pivotally connect thereto a pin-mounted, load-carrying link L (shown by broken lines in FIG. 1), or other load connecting devices.

The reverse bend portions 88 and 86 are shaped so that the inner end portions or legs 96 and 98, respectively, of the camming lever 80 are parallel and are spaced apart a distance slightly greater than the thickness of the wedge plate 6. The legs 96 and 98 have aligned openings 100, which are of the same diameter as the opening 76. The lever 80 is pivotally connected to the wedge plate 6 by a rivet or other pivot pin 102, passed through the openings 100 and 76.

The outer, upper corners of the legs 96 and 98 have camming surfaces 104 thereon which gradually increase in radius in a counter-clockwise direction, and which are shaped to be progressively engageable with the inclined lower bracket edges 20 as the camming lever 80 is pivoted from a retracted position, wherein it extends at less than 90 degrees from the bracket rear edge 16, toward an applied position, whereby it forms a progressively increasing obtuse angle with said rear edge 16. As the camming surfaces 104 progressively engage the bracket and edges 20, the wedge plate 6 is moved downwardly progressively relative to the bracket 4. During such movement, the stationary key element 34 and the inclined slot 32 cooperate to move the clamping edge 28 progressively toward the U-shaped connecting portion 10, whereby a progressively increasing clamping force is applied to the line 12.

It is apparent that when a load is applied through the link L to the outer end of the camming lever 80, the lever will be moved clockwise toward its applied position and the grip 2 will securely grasp the line 12. When the lever 80 is subsequently moved counterclockwise toward its retracted position, the line 12 will be released, and thereafter the grip 2 can be slid along the line 12 to whatever new location is desired. The grip 2 can, of course, be removed completely from the line 12 by taking out the locking key element 34.

It is desirable to have a degree of preloading on the camming lever 80, to continuously urge the clamping edge 28 into light gripping contact with the line 12. This ensures that when an external load is suddenly applied to the lever through the link L, immediate tight gripping of the line 12 will occur. This preloading is effected automatically by a spring 106, one end of which is received in a notch 108 in the lower front corner of the wedge plate 6, and anchored on a pin 110 mounted in openings 107, to span said notch. The other end of the spring 106 is anchored on a pin 112, mounted with its opposite ends received in aligned openings 114 near the upper, inner corners of the legs 96 and 98 of the camming lever 80.

Obviously, many modifications and variations of the present invention are possible in the light of the above teachings. It is therefore to be understood that the invention can be practiced otherwise than as specifically shown and described.

I claim:

1. A grip device for mounting on a line, comprising: a bracket including a pair of parallel side plates spaced apart a distance sufficient to receive a line therebetween, said side plates being joined along one side edge thereof by a U-shaped connecting portion; a wedge plate slidably received within said bracket and including a clamping side edge positioned to confront said U-shaped connecting portion, one end of said wedge plate projecting beyond one end of said bracket, said wedge plate having an elongated slot therein inclined outwardly and upwardly relative to said clamping edge; key means carried by said bracket and extending through said elongated slot, said key means and said elongated slot cooperating to cause said clamping edge to move toward said U-shaped connecting portion when said projecting end of said wedge plate is moved in a direction away from said one end of said bracket; and a camming lever pivotally connected near one end thereof to said projecting end of said wedge plate is moved in a direction away from said one end engageable with said one end of said bracket when said lever is swung from a first, retracted position toward a second, applied position, said cam surface being shaped and positioned to move said projecting end of said wedge plate away from said one end of said bracket when said lever is swung toward said applied position to thereby urge said clamping edge toward said U-shaped connecting portion; and means on said lever spaced from said one end thereof and said cam surface for connecting a load to said lever.

2. A grip device as recited in claim 1, wherein said lever is bifurcated to form a pair of legs for receiving said projecting end of said wedge plate, said legs and said wedge plate having aligned openings therethrough; a pivot pin mounted in said openings, said legs each having a rounded cam surface thereon engageable with the end portion of one of said bracket side plates.

3. A grip device as recited in claim 1, wherein the end portions of said bracket side plates engageable by said cam surfaces extend at an angle of about 60° from the joined side edges of said bracket side plates.

4. A grip device as recited in claim 1, wherein said elongated slot in said guide plate extends at an angle of about 22.5° relative to the clamping side edge of said plate.

5. A grip device as recited in claim 1, including additionally, resilient means connected between said camming lever and said guide plate, effective to bias said lever arm toward said applied position thereof.

6. A grip device as recited in claim 1, wherein said key means is removable, whereby said device can be disassembled for mounting on a line, and then reassembled.

7. A grip device as recited in claim 1, wherein said side plates have confronting key-receiving slots therein extending parallel to the elongated slot in said wedge plate, said key means being receivable through said key-receiving slots and said elongated slot, and said elongated slot being substantially longer than said key-receiving slots.

8. A grip device as recited in claim 7, wherein said key means includes: a body having an end portion receivable through said aligned key-receiving slots; a lock element carried on said end portion of said body, and movable between a first position wherein it can be inserted through said key-receiving slots with said body end portion, and a second position wherein it is engageable with said bracket to prevent withdrawal of said body end portion from said key-receiving slots; and resilient means carried by said body and engageable with the side of said bracket opposite that on which the lock element is disposed when said key means is inserted in said bracket, and operable to bias said body in a direction to engage said lock element with said bracket when the lock element is in said second position thereof.

9. A grip device as recited in claim 8, wherein said key body comprises a plate, said plate having an elongated opening therethrough spaced from said end portion, said resilient means comprising: a guide pin extending the length of said elongated opening; a retainer element mounted on said guide pin, said retainer element projecting beyond the opposite side surfaces of said body plate and being engageable with said bracket when said key means is inserted in said key-receiving slots; and a spring mounted on said guide pin on the side of said retainer opposite said lock element, said spring urging said retainer toward said lock element.

10. A grip device as recited in claim 8, including a safety line connected between said key means and said wedge plate, to prevent misplacement and loss of said key means.

References Cited

UNITED STATES PATENTS 2,638,618   5/1953   Legge.

FOREIGN PATENTS 532,110   10/1954   Belgium.
904,455   2/1954   Germany.

BERNARD A. GELAK, Primary Examiner

U.S. Cl. X.R.

24—212